United States Patent [19]

Nakamura et al.

[11] Patent Number: 5,165,282
[45] Date of Patent: Nov. 24, 1992

[54] SEMICONDUCTOR PRESSURE SENSOR

[75] Inventors: Tetsuro Nakamura; Makoto Ishida; Shoji Kawahito, all of Toyohashi; Yasuji Hikita, Yokohama, all of Japan

[73] Assignee: Toyoko Kagaku Co., Ltd., Kawasaki, Japan

[21] Appl. No.: 611,284

[22] Filed: Nov. 9, 1990

[51] Int. Cl.⁵ .............................. G01L 7/08; G01L 9/06
[52] U.S. Cl. ........................................ 73/727; 73/721; 92/103 SD; 338/4
[58] Field of Search .............. 73/727, 719, 720, 721, 73/754, 756, DIG. 4, 115; 338/4; 92/103 SD

[56] References Cited

U.S. PATENT DOCUMENTS

| 3,858,150 | 12/1974 | Gurtler et al. | 29/621.1 |
| 3,938,175 | 2/1976 | Jaffe et al. | 29/621.1 |
| 4,784,721 | 11/1988 | Holmen et al. | 29/621.1 |

Primary Examiner—Donald O. Woodiel
Attorney, Agent, or Firm—Armstrong & Kubovcik

[57] ABSTRACT

A semiconductor pressure sensor comprises a diaphragm formed by anisotropic etching of silicon single crystal, characterized in that an etch-stop layer is provided at the site where etching is to be stopped, and that an etch-stop layer having insulating property is provided as the insulating layer of the pressure-sensitive portion.

3 Claims, 5 Drawing Sheets

SEMICONDUCTOR PRESSURE SENSOR

BACKGROUND OF THE INVENTION

The present invention relates to a semiconductor pressure sensor to be used for various purposes such as medical treatment.

A semiconductor pressure sensor is used to measure pressure based on the principle that the resistance value of silicon changes according to the deformation of a silicon diaphragm.

To increase the sensitivity of this pressure sensor, it is better that the silicon diaphragm is thinner. However, because the problem of strength arises when it is too thin, it is normally practiced to cut silicon wafer to the thickness of 0.5-1 mm mechanically or by chemical agent except the supporting part so that the pressure-sensitive portion has a thickness of several microns.

In case it is cut or thinned down mechanically or by chemical agent, it is extremely difficult to accurately control the thickness of the silicon diaphragm because the etching speed varies according to the concentration, temperature, etc. of the etching solution. For this reason, the thickness control by etching has been performed in the past by PN junction or change of the impurity concentration of silicon. Even when pressure sensor is produced by above mentioned methods, the thickness is not controlled satisfactorily. Moreover, this method was disadvantageous because temperature characteristics—especially, high temperature characteristics, are not so good.

SUMMARY OF THE INVENTION

To solve these problems, it is an object of the present invention to provide a pressure sensor which has excellent temperature characteristics and the diaphragm of which is controlled to the constant thickness as desired, and also to provide a method for manufacturing such a pressure sensor.

Another object of the invention is to provide a method for manufacturing a semiconductor pressure sensor, in which the thickness of the diaphragm is controlled to the desired thickness.

To attain the above objects, the semiconductor pressure sensor of this invention comprises a diaphragm produced by anisotropic etching of silicon single crystal, characterized in that an etch-stop layer is formed on the portion where etching is to be stopped, and that an etch-stop layer having insulating property is formed on the insulating layer of the pressure-sensitive portion.

The method for manufacturing the pressure sensor of this invention is characterized in that it comprises:
- a process for forming $SiO_2$ layer by heating and oxidizing the junction surface of silicon single crystal wafer;
- a process for bonding said $SiO_2$ layers of two silicon single crystal wafers, on which $SiO_2$ layer is formed;
- a process for preparing the upper and the lower surfaces of the bonded silicon single crystal wafers to constant thickness by lapping and polishing;
- a process for epitaxially growing Si, single crystal $Al_2O_3$ and Si sequentially on upper surface of silicon crystal wafer having constant thickness; and
- a process for removing the lower surface of silicon single crystal wafer by etching except the supporting portion.

Also, the method for manufacturing the pressure sensor of this invention is characterized in that single crystal $Al_2O_3$ is epitaxially grown on silicon single crystal wafer, that Si is then epitaxially grown on its upper surface, and further, single crystal $Al_2O_3$ and Si are epitaxially and sequentially grown on upper surface.

The other objects and features of this invention will become obvious by the description below provided in connection with the attached drawings.

DETAILED DESCRIPTION OF THE PREFERRED EMBODIMENTS

In the following, the preferred embodiments of the present invention will be described in connection with the drawings.

Figure 1:
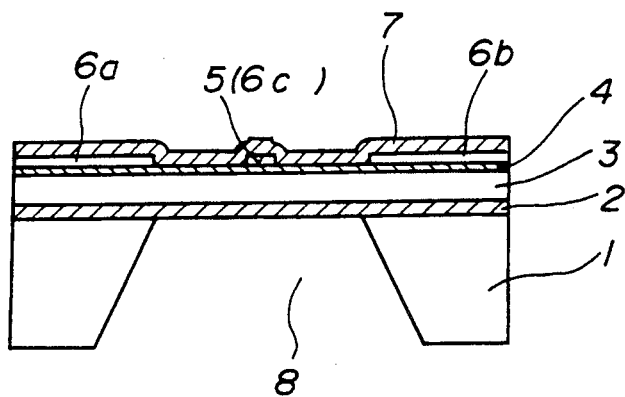
FIG. 1 is a sectional view of an embodiment of this invention.

FIG. 1 is a sectional view of an embodiment of this invention. On the upper surface of the supporting portion 1, $SiO_2$ layer 2, single crystal Si layer 3 and single crystal $Al_2O_3$ layer 4 are sequentially stacked. On the upper surface of $Al_2O_3$ layer 4, a strain gauge 5 formed in silicon layer 6c is laminated at the center and silicon layers 6a and 6d are laminated on side portions. A protective film 7 of $SiO_2$ is laminated on it.

In the above embodiment, $SiO_2$ layer 2 is formed as etch-stop layer at the site where etching is to be stopped, and the insulating layer of the pressure-sensitive portion of an alumina layer 4 is formed as an etch-stop layer. Thus, it is possible to form the pressure-sensitive portion with the desired constant thickness and having excellent temperature characteristics.

Figure 2:
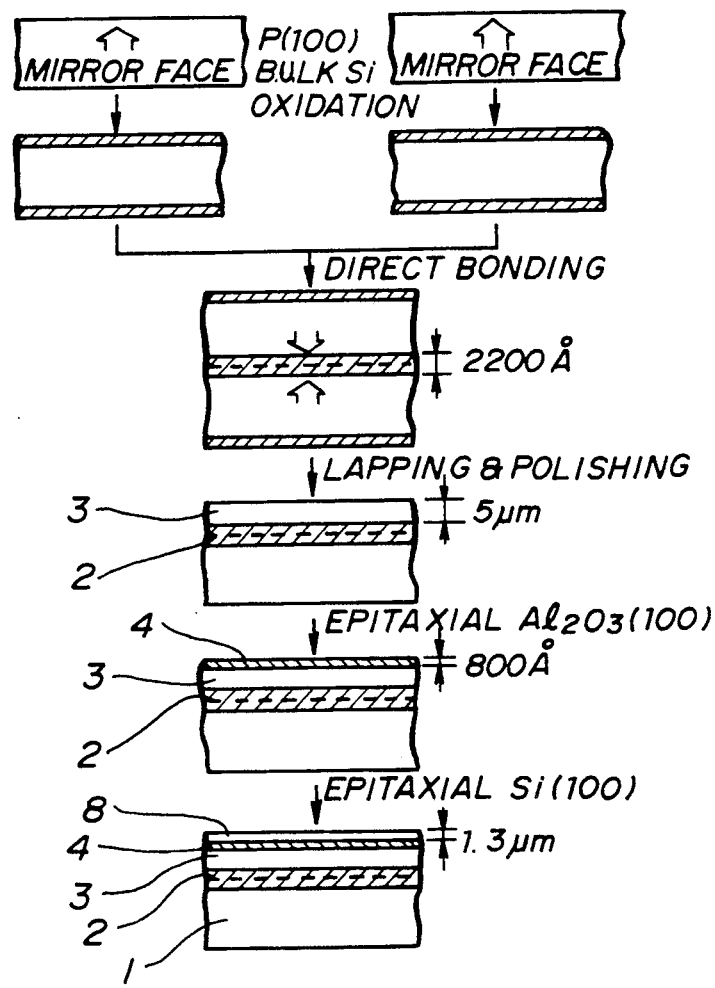
FIG. 2 is a sectional view showing the method for manufacturing the pressure sensor of this invention.

Next, description is given on the method for manufacturing the pressure sensor of this invention in connection with FIG. 2.

Two Si wafers of (100) P-type are prepared, on which $SiO_2$ layer is thermally grown in thickness of 110 nm. These were bonded in an oxidation furnace kept at 1000° C., and the wafers thus bonded are heated for 30 minutes in wet atmosphere in the above oxidation furnace. On the bonded surface, $SiO_2$ film of 2200 Å thick made of oxidized Si is formed. Then, $SiO_2$ layer on outer peripheral surface is removed by normal lapping method, and the impurities attached by lapping are removed by etching. Further, it is polished in thickness of 10 $\mu$m by normal polishing process. Finally, by computerized mechanical-chemical (M-C) polishing, 1st SOI (Si on insulator) layer 3 is polished to thickness of 5±0.2 $\mu$m. Then, $Al_2O_3$ is epitaxially grown on upper surface of 1st SOI layer 3 by normal CVD method, and 2nd insulating layer 4 is formed, which consists of $Al_2O_3$ film of 80 μm. Next, Si layer 8 of 1.3 μm thick is epitaxially grown on upper surface of 2nd insulating layer 4 by CVD method.

The bottom portion of the silicon wafer thus obtained is removed by etching using KOH, and a cavity 8 is formed. The silicon layer on the upper surface is also removed by etching, only leaving the central portion 6c and the side portions 6a and 6b.

Then, a strain gauge 5 is formed on the central portion 6c by the known procedure based on the diffusion method, and a protective film 7 of $SiO_2$ is formed by CVD method on the entire upper surface. Thus, the pressure sensor of this invention as given in FIG. 1 is obtained.

Figure 3:
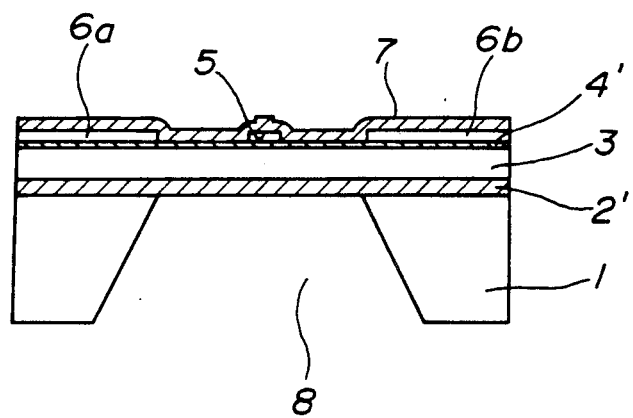
FIG. 3 is a sectional view of another embodiment of this invention.

FIG. 3 is a sectional view of another embodiment of this invention. As an etch-stop layer to stop the etching on bottom portion, single crystal $Al_2O_3$ layer 2' is formed, and single crystal $Al_2O_3$ layer 4' is provided on the insulating layer of the pressure-sensitive portion. Other arrangements are the same as the above embodiment.

To manufacture the pressure sensor of FIG. 3 above, $Al_2O_3$ layer 2', Si layer 3, $Al_2O_3$ layer 4 and silicon layer are sequentially and epitaxially grown on the Si substrate by the CVD method, and the same procedure as in the pressure sensor of FIG. 1 is performed.

In the embodiments shown in FIG. 1 and FIG. 3 above, $SiO_2$ or $Al_2O_3$ is used as the etch-stop layer, whereas the other substance such as $Si_3N_4$ may be used as far as it stops etching and it does not adversely affect the pressure sensor.

In the above embodiments, $Al_2O_3$ is used as the insulating layer of the pressure-sensitive portion, whereas the other substance may be used if it has insulating property and etch-stopping property and if single crystal is grown on its upper surface and it does not adversely affect the pressure sensor. As such substances, there are, for instance, $SiO_2$, $Si_3N_4$, etc.

Next, an example of a test for the pressure sensor of FIG. 1 is described.

Figure 4:
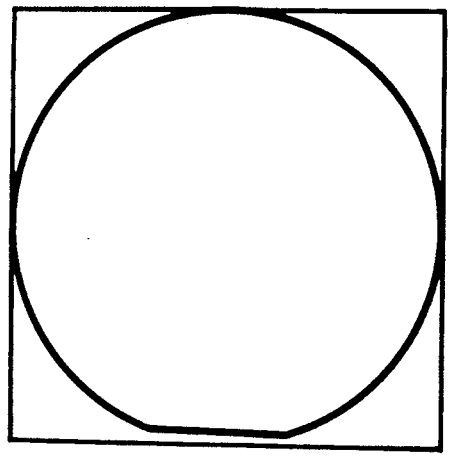
FIG. 4 is an enlarged view of an ultrasonic image showing the presence or non-presence of unbonded part and pores on the directly bonded surface of the pressure sensor of this invention.

The unbonded portion and pores on the surface directly bonded in an oxidation furnace were measured by an ultrasonic detection method. In the case unbonded portion or pore is present, the ultrasonic wave is reflected at such portion, and black spots should appear in FIG. 4. FIG. 4 is a view traced from the electron micrograph of the ultrasonic image.

As the result, neither unbonded portion nor pore was detected as shown in FIG. 4.

Figure 5:
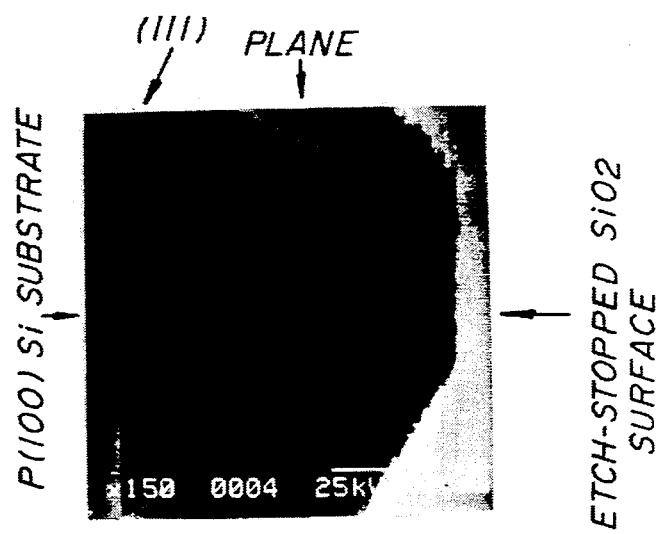
FIG. 5 is an electron micrograph showing a SEM image of the $SiO_2$ surface where etching is stopped.

FIG. 5 shows a sectional micrograph of cleaved silicon film, which was formed by selective anisotropic etching using KOH.

As shown in the figure, the etch-stopped $SiO_2$ surface was extremely flat. By the etch-stopping property of $SiO_2$, very flat and uniform films can be obtained.

Figure 6:
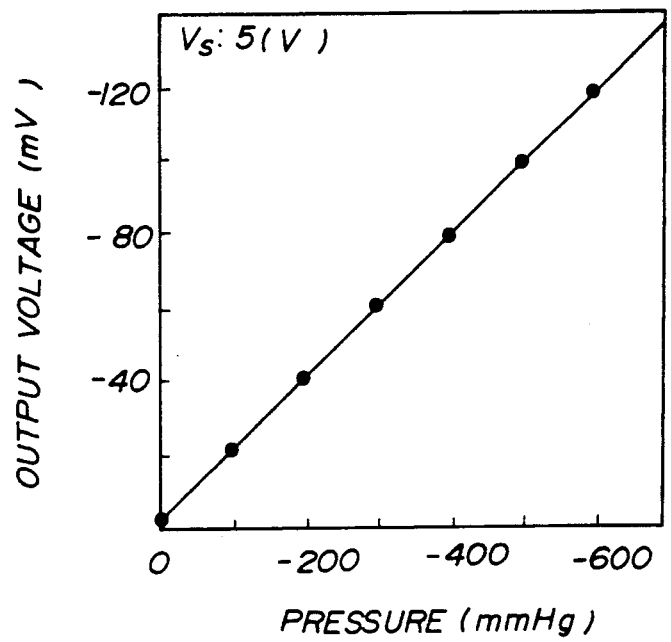
FIG. 6(a) is a diagram of output voltage to the applied pressure of the pressure sensor of this invention, and FIG. 6 (b) is a diagram of the measurement of non-linearity to the pressure.
Figure 6:
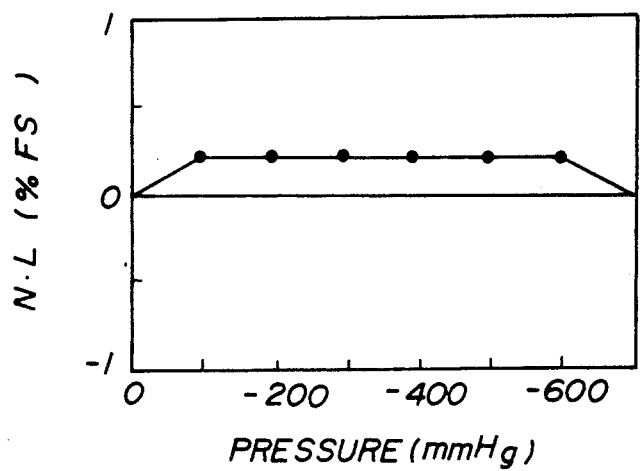

Next, the results of the measurement of sensitivity characteristics are shown. FIG. 6 (A) gives the results of the measurements of output voltage to the applied pressure, and FIG. 6 (B) represents the results of the measurement of non-linearity to the pressure.

As the result, the sensitivity of the pressure sensor was 0.04 mV/V mmHg in total pressure range of 700 mmHg, and the non-linearity was smaller than +0.5% FS.

Figure 7:
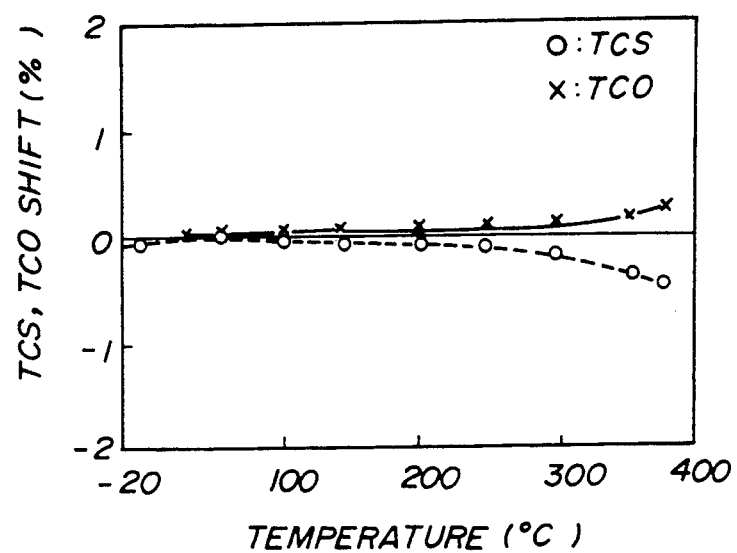
FIG. 7 is a diagram showing the temperature characteristics of the sensitivity and offset voltage of the pressure sensor of this invention.

FIG. 7 shows the results of the measurement of temperature characteristics of sensitivity and offset voltage.

As the result, the temperature coefficient of sensitivity (TCS) and the temperature coefficient of offset voltage (TCO) were less than $-0.2\%/°C$. and $0.1\%/°C$. respectively in the temperature range of $-20°$ C. to $+350°$ C.

As described above, it is possible by this invention to form a diaphragm in constant thickness because etch-stop layers are provided at the site where etching is to be stopped and as the insulating layer of the pressure-sensitive portion. Also, the pressure sensor thus produced has remarkable features not found in the conventional type pressure sensor such as excellent temperature characteristics because the etch-stop layer having insulating property is formed as the insulating layer of the pressure-sensitive portion.

What is claimed is:

1. A semiconductor pressure sensor, comprising a diaphragm formed by anisotropic etching of silicon single crystal, a first etch-stop layer provided at a site where etching is to be stopped and a second etch-stop layer having insulating property provided as an insulating layer of a pressure-sensitive portion of said diaphragm.

2. A semiconductor pressure sensor according to claim 1, wherein said first etch-stop layer and said second etch-stop layer having insulating property are single crystal $Al_2O_3$.

3. A semiconductor pressure sensor according to claim 1, wherein said first etch-stop layer formed at the site where etching is to be stopped as $SiO_2$ and said second etch-stop layer having insulating property is single crystal $Al_2O_3$.

* * * * *

UNITED STATES PATENT AND TRADEMARK OFFICE
CERTIFICATE OF CORRECTION

PATENT NO.  : 5,165,282
DATED       : November 24, 1992
INVENTOR(S) : Tetsuro NAKAMURA et al.

It is certified that error appears in the above-identified patent and that said Letters Patent is hereby corrected as shown below:

On the cover page, between Items [22] and [51], insert additional item:
--Foreign Application Priority Data
October 11, 1990 [JP]    Japan .................... 2-273080--.

Signed and Sealed this

Thirtieth Day of November, 1993

Attest:

*Attesting Officer*

BRUCE LEHMAN

*Commissioner of Patents and Trademarks*